Figure 3:
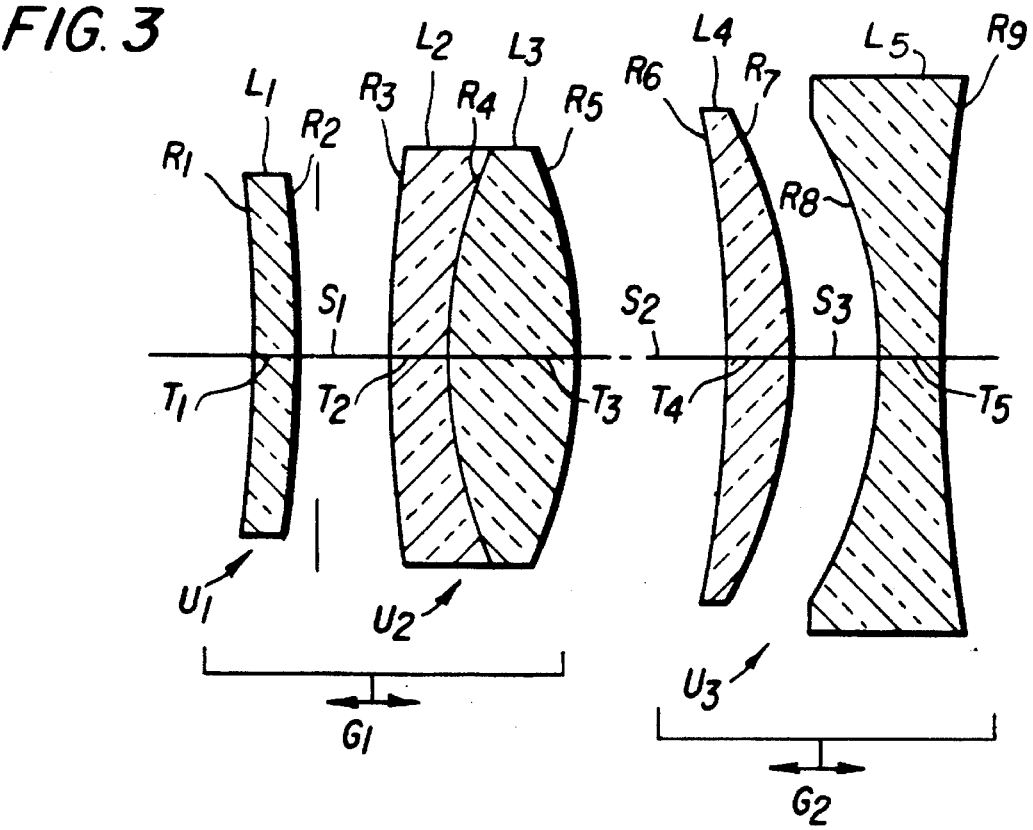

United States Patent [19]
Betensky et al.

[11] Patent Number: 5,493,448
[45] Date of Patent: Feb. 20, 1996

[54] ZOOM LENS HAVING WEAK FRONT LENS GROUP

[75] Inventors: Ellis I. Betensky, W. Redding, Conn.; Melvyn H. Kreitzer, Cincinnati, Ohio

[73] Assignee: Eastman Kodak Company, Rochester, N.Y.

[21] Appl. No.: 148,811

[22] Filed: Nov. 8, 1993

Related U.S. Application Data

[62] Division of Ser. No. 792,504, Nov. 4, 1991, Pat. No. 5,315,440.

[51] Int. Cl.$^6$ ............................................. G02B 15/14
[52] U.S. Cl. .......................... 359/692; 359/676; 359/691
[58] Field of Search .................................. 359/676–677, 359/691–693, 708, 717, 718, 728, 793–795

[56] References Cited

U.S. PATENT DOCUMENTS

| | | | |
|---|---|---|---|
| 4,198,128 | 4/1980 | Ogino | 359/681 |
| 4,682,860 | 7/1987 | Tanaka et al. | 359/692 |
| 4,720,179 | 1/1988 | Ito | 359/692 |
| 4,726,665 | 2/1988 | Itoh | 359/681 |
| 4,772,106 | 9/1988 | Ogata et al. | 359/692 |
| 4,787,718 | 11/1988 | Cho | 359/686 |
| 4,818,081 | 4/1989 | Ito | 359/692 |
| 4,830,476 | 5/1989 | Aoki | 359/692 |
| 4,836,660 | 6/1989 | Ito | 359/692 |
| 4,838,660 | 6/1989 | Fergason | 359/52 |
| 4,838,669 | 6/1989 | Ogata et al. | 359/692 |
| 4,854,683 | 8/1989 | Ozawa | 359/689 |
| 4,889,416 | 12/1989 | Yamada | 359/676 |
| 4,906,077 | 3/1990 | Ito | 359/692 |
| 4,911,539 | 3/1990 | Tsunashima et al. | 359/676 |
| 4,936,661 | 6/1990 | Betensky et al. | 359/692 |
| 4,953,957 | 9/1990 | Kobayashi | 359/652 |
| 4,963,010 | 10/1990 | Kikuchi | 359/654 |
| 4,984,877 | 1/1991 | Ito | 359/692 |
| 4,991,945 | 2/1991 | Estelle | 359/692 |
| 4,993,814 | 2/1991 | Hata | 359/691 |
| 5,000,549 | 3/1991 | Yamazaki | 359/557 |
| 5,071,235 | 12/1991 | Mori et al. | 359/692 |
| 5,270,861 | 12/1993 | Estelle | 359/692 |
| 5,280,390 | 1/1994 | Ito | 359/692 |
| 5,315,440 | 5/1994 | Betensky et al. | 359/692 |

FOREIGN PATENT DOCUMENTS

| | | |
|---|---|---|
| 2184865 | 7/1987 | United Kingdom . |
| 2215086 | 9/1989 | United Kingdom . |
| 2216680 | 10/1989 | United Kingdom . |
| 2237403 | 5/1991 | United Kingdom . |

*Primary Examiner*—Thong Q. Nguyen
*Attorney, Agent, or Firm*—Svetlana Z. Short

[57] ABSTRACT

A zoom lens having two groups of lens components including from the object side a positive group and a negative group. The positive group includes two lens units, a weak unit, and a positive unit, while the negative group has at least one negative lens component and provides most of the magnification change during zooming.

14 Claims, 2 Drawing Sheets

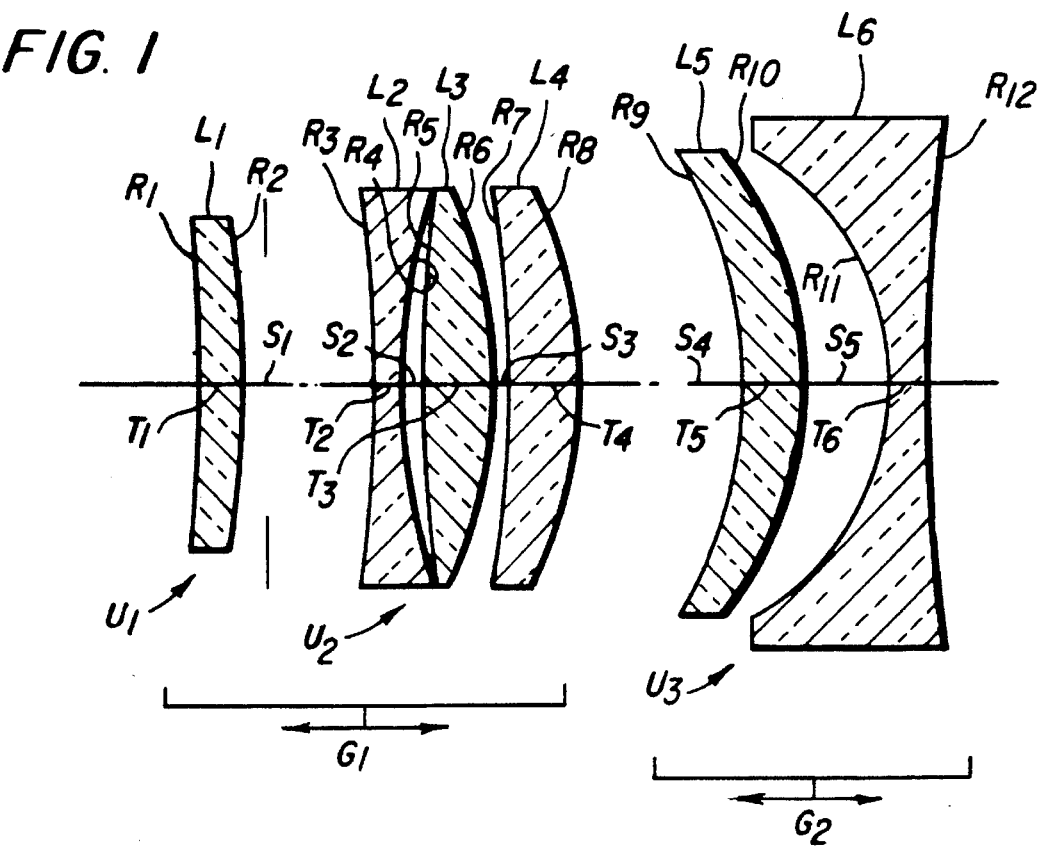
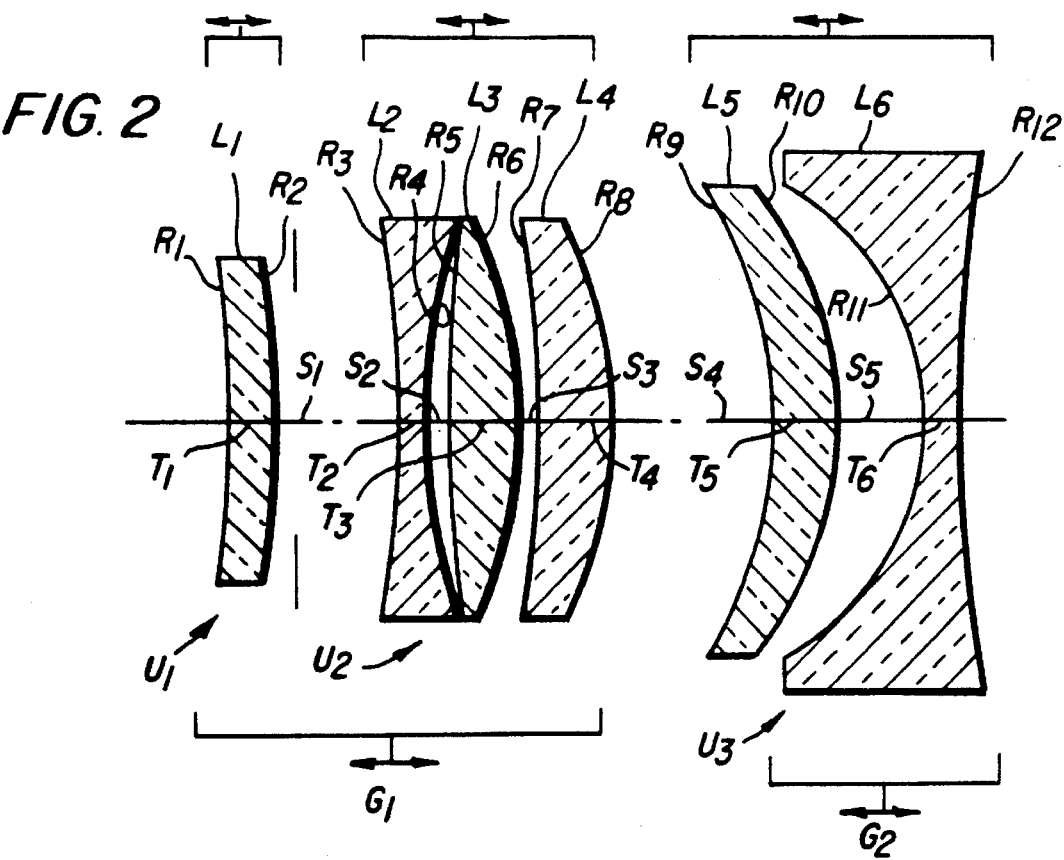

ZOOM LENS HAVING WEAK FRONT LENS GROUP

This is Divisional of application Ser. No. 792,504 filed Nov. 4, 1991, now U.S. Pat. No. 5,315,440.

TECHNICAL FIELD

This invention relates to compact zoom lenses. Although the invention has general application, it is particularly usable in still photographic cameras.

BACKGROUND ART

U.S. Pat. No. 4,936,661 to E. I. Betensky et al, issued Jun. 26, 1990, describes a zoom lens with a short back focal length and having, from front to rear, negative, positive and negative optical units. The negative unit closest to the image is movable during zooming to provide a majority of the change in focal length. In some of the examples, the front two units move as a single optical group during zooming, and in others they move relative to each other during zooming. These lenses have remarkable corrections and compactness for their aperture, zoom range and simplicity. The short back focal length makes them particularly usable as zoom objectives in "viewfinder" (non- SLR) cameras.

U.S. Pat. Nos. 4,836,660 and 4,720,179, issued Jun. 6, 1989 and Jan. 19, 1988, respectively, to Ito, show relatively complex zoom lenses also having a moving rear negative lens group. A front positive group is composed of a weak front negative optical unit which in turn is made up of several strong single element lens components.

U.S. Pat. No. 4,854,683, Ozawa, issued Aug. 8, 1989 has a fixed positive component between a rear negative lens group and the image plane in a construction otherwise somewhat similar to the Ito lenses.

Other similar zoom lenses are shown in U.S. Pat. Nos. 953,957, to Kobayashi, issued Sep. 4, 1990; 4,889,416, to Yamada, issued Dec. 26, 1989; 4,993,814, to Hata, issued Feb. 19, 1991; 787,718, to Cho, issued Nov. 29, 1988; 4,830,476 to Aoki, issued May 16, 1989; and 4,818,081 to Ito, issued Apr. 4, 1989. These lenses are complex, have several correcting elements and as a consequence are limited in both aperture and focal length range.

SUMMARY OF THE INVENTION

Most of the above lenses include a positive second unit which moves during zooming, which positive unit contains the primary lens aperture stop. This results in an effective aperture at this positive unit which becomes proportionally larger as the focal length is increased, unless the relative aperture of the entire lens is allowed to decrease substantially with the increase in focal length. If the focal length range is extended beyond 2 to 1, the problem is more severe, and correcting the aberrations for the larger aperture is not generally consistent with the desirability of compactness, low cost and general simplicity of design.

According to the invention, these problems are solved by a zoom lens having two groups of lens components. It includes from the object side, a first positive group and a second negative group. The zoom lens achieves zooming between a wide angle position and a narrow angle position by changing the distance between the first and second groups. The first group includes two lens units, a first, weak unit having no strong lens component and positioned on the object side of the first group and a second positive unit following the first lens unit. The second negative group provides most of the magnification change during zooming. In the embodiments described herein, the zoom lenses satisfy the following condition:

$$\frac{|K_1|}{K_w} < 0.4$$

where $K_x$ is the power of the first unit and $K_w$ is the power of the zoom lens at its wide angle position.

$K_1/K_w$.According to preferred embodiments, the magnitude of the ratio is equal to 0.1 or less. According to some embodiments, the ratio is slightly negative and some it is slightly positive.

For lowest cost and greatest simplicity, the preferred embodiment of the first unit is a single element with at least one aspheric surface. The weak front optical unit serves as an aberration corrector, but because of the weak power the aperture size of the second optical unit can be small. Further, with a very weak front unit, the aperture stop can be positioned in front of the second unit, e.g., close to the first optical unit. Thus the aperture of the second unit is not increased during zooming. Yet, the aberration correcting ability of a separated first unit is retained. Placing the aperture stop forward of the second unit rather than in its center or behind it allows the second unit to participate more fully in the correction of all aberations and assures a small front window. At the same time, the aperture stop can be placed close to the first optical unit which minimizes the front unit's lens elements diameters and reduces or eliminates variation of entrance pupil position during zooming.

According to another preferred embodiment, the color correction of the first group is achieved by including at least one negative lens element into the second positive optical unit. Thus, the first optical unit need not contribute to color correction, further facilitating its simplicity. The space between the first and the second optical units of the first optical group may or may not vary during zooming.

With this invention, well corrected zoom lenses are obtained with apertures varying from f/4.4 to f/6.8 across a zoom range of about 2.3 to 1 using as few as five or six elements, all of which can be plastic.

SPECIFIC DESCRIPTION OF THE DRAWINGS

Figure 4:
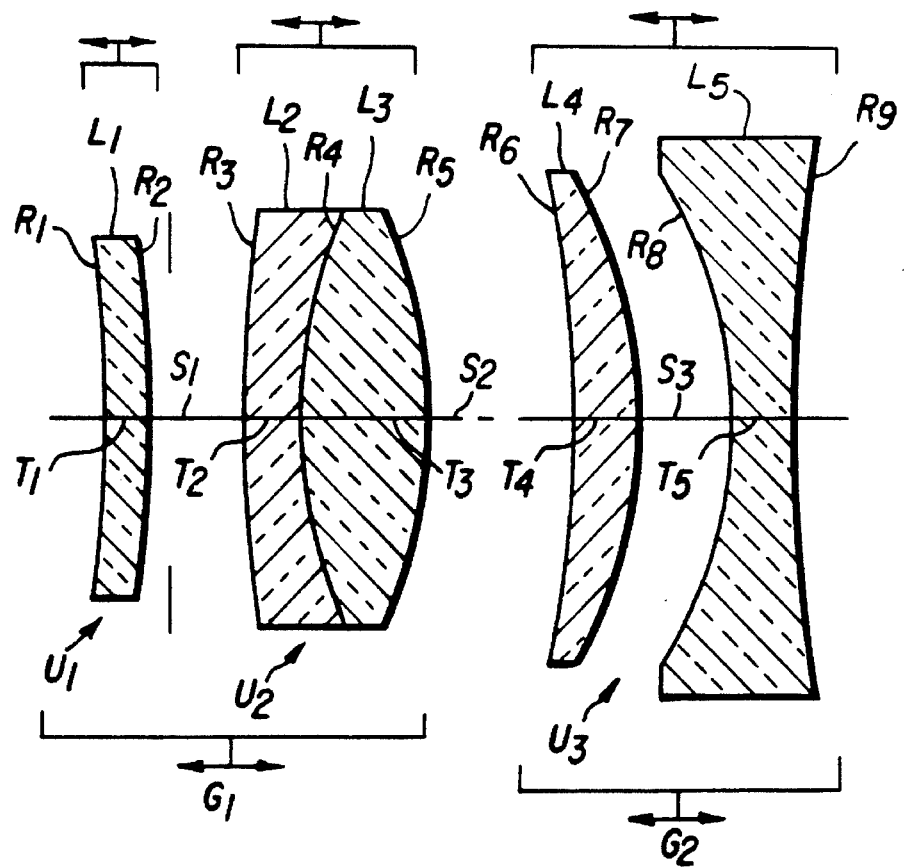

In the detailed description of the preferred embodiment of the invention presented below, reference is made to the accompanying drawings, in which:

FIGS. 1–4 are simplified schematic cross-sectional views of a zoom lens constructed according to four embodiments of the present invention.

BEST MODES OF CARRYING OUT THE INVENTION

The embodiments of the invention are illustrated by a series of examples set forth in Tables 1A–8C. In the tables and in the drawings the surfaces R are numbered by subscripts from the front or object side of the lens to the rear or image side of the lens. The thickness of the lens elements T and the spacings between elements S are also numbered from front to rear. For example, $S_1$ corresponds to the first air space, $S_2$ to the second air space, $S_3$ to the third air space and $S_4$ to the fourth airspace. In the tables, surfaces and thicknesses are listed on the same line as the surface preceding the thickness or spacing as the case may be. All indexes $N_e$ are for the mercury e line of the spectrum at a wavelength $\lambda_e$ of 5461 Å. V is the Abbe number for the lens material. Although these specific lenses are all designed for complete or substantial use of plastics, they can be converted to comparable glass lenses with some changes in curvatures, thicknesses and spacings, as is well known in the art.

All of the examples contain three optical units, specified as $U_1$, $U_2$ and $U_3$ in the drawings. $U_1$ and $U_2$ make up the first group and $U_3$ is the second group. In the embodiment shown in FIGS. 1 and 3, optical units $U_1$ and $U_2$ move together during zooming, and the space between these two optical units does not vary for zooming. These embodiments thus have the substantial advantage of requiring a much simpler zooming mechanism. In the embodiments shown in FIGS. 2 and 4, the air space between the optical units $U_1$ and $U_2$ varies during zooming.

Optical unit $U_1$ in each example is a very weak single-element lens. Preferably, both surfaces of it are aspheres. In Examples 1, 2, 5, 6, and 8, this element is slightly negative in power. In Examples 3, 4 and 7 it is very slightly positive in power. In all examples, its power is less than 0.4 times that of the power of the entire lens at its wide angle position. However, its power is preferably considerably less than this limit, for example, less than 0.1 times the power of the entire lens as is the case with the Examples 3 and 4.

The second lens unit is positive in all examples. In Examples 1–5 and, it contains three very slightly air-spaced elements. In examples 6and 8 it is a cemented doublet. For illustration, the air spaces between the elements of the second group are slightly exaggerated in both FIGS. 1 and 2. The second lens unit contains a negative lens element to facilitate the color correction of the optical system.

The aperture stop is positioned between the first and second optical units. This is permitted because the weakness of the first unit, it facilitates correction of the lens especially at its telephoto position, as well as minimizing the aperture size of the second optical unit. This permits a large numerical aperture lens (f/6.8) at the long focal length position, while maintaining an aperture of at least f/4.5 at the short focal length position in a zoom lens having a focal range of 2.1 or larger.

The third optical unit $U_3$ is substantially negative in power. Its movement provides most of the change in focal length of the lens during zooming.

Note that all of the examples are corrected across a zoom range of between 2.2X and 2.3X with an effective aperture that varies from approximately f/4.4 to f/6.8. This wide an aperture across this range for a 6 element zoom lens suitable for a 35 mm camera is quite an achievement. It is especially so, considering that each lens is made entirely of plastic elements.

EXAMPLE 1

TABLE 1A

| SURFACE | RADIUS | THICKNESS/ SPACING | $N_3$ | V |
|---|---|---|---|---|
| $R_1$ | −50.25 | 1.50 | 1.5949 | 30.7 |
| $R_2$ | −80.44 | 3.33 | | |
| Diaphragm | ∞ | 2.51 | | |
| $R_3$ | 81.95 | 1.50 | 1.5949 | 30.7 |
| $R_4$ | 24.91 | .05 | | |
| $R_5$ | 22.92 | 3.30 | 1.4938 | 56.9 |
| $R_6$ | −22.68 | .20 | | |
| $R_7$ | −140.58 | 3.30 | 1.4938 | 56.9 |
| $R_8$ | −16.55 | Variable | | |
| $R_9$ | −67.64 | 2.50 | 1.5949 | 30.7 |
| $R_{10}$ | −18.43 | 3.20 | | |
| $R_{11}$ | −10.94 | 2.00 | 1.5387 | 40.2 |

TABLE 1A-continued

| SURFACE | RADIUS | THICKNESS/ SPACING | $N_3$ | V |
|---|---|---|---|---|
| $R_{12}$ | 53.26 | Variable | | |

$\lambda_e = 5461\text{Å}$

TABLE 1B

POLYNOMIAL ASPHERS
(COEFFICIENTS OF THE EVEN POWERED TERMS)

| SURFACE | AD (4TH) | AE (6TH) | AF (8TH) |
|---|---|---|---|
| $R_1$ | 9.154E-06 | 8.379E-07 | 3.433E-09 |
| $R_2$ | 8.732E-05 | 1.241E-06 | 1.112E-08 |
| $R_{11}$ | −2.376E-05 | 5.626E-08 | −3.937E-09 |

| SURFACE | AG (10TH) | AH (12TH) | AI (14TH) |
|---|---|---|---|
| $R_1$ | 9.794E-12 | −3.311E-12 | 3.037E-14 |
| $R_2$ | −1.748E-10 | 1.570E-12 | 1.056E-14 |
| $R_{11}$ | 1.637E-11 | 2.414E-13 | −1.880E-15 |

| SURFACE | Conic Constants | | |
|---|---|---|---|
| $R_{11}$ | −1.000E+00 | | |

TABLE 1C

ZOOM SPACING DATA

| POSITION | $S_4$ | BFL | EFL | F/# |
|---|---|---|---|---|
| 1 | 11.43 | 15.0 | 39.0 | 4.4 |
| 2 | 3.91 | 39.4 | 60.0 | 6.3 |
| 3 | 0.10 | 65.9 | 82.6 | 6.6 |

EXAMPLE 2

TABLE 2A

| SURFACE | RADIUS | THICKNESS/ SPACING | $N_e$ | V |
|---|---|---|---|---|
| $R_1$ | −38.87 | 1.38 | 1.5949 | 30.7 |
| $R_2$ | −45.07 | .04 | | |
| Diaphragm | ∞ | 4.75 | | |
| $R_3$ | −33.96 | 1.38 | 1.5949 | 30.7 |
| $R_4$ | 30.12 | .05 | | |
| $R_5$ | 28.60 | 3.04 | 1.4938 | 56.9 |
| $R_6$ | −19.72 | .10 | | |
| $R_7$ | −304.49 | 3.04 | 1.4938 | 56.9 |
| $R_8$ | −13.93 | Variable | | |
| $R_9$ | −35.00 | 3.38 | 1.5949 | 36.7 |
| $R_{10}$ | −13.87 | 2.93 | | |
| $R_{11}$ | −9.75 | 1.84 | 1.5387 | 40.2 |
| $R_{12}$ | 53.01 | Variable | | |

TABLE 2B

POLYNOMIAL ASPHERS
(COEFFICIENTS OF THE EVEN POWERED TERMS)

| SURFACE | AD (4TH) | AE (6TH) | AF (8TH) |
|---|---|---|---|
| $R_1$ | 1.582E-05 | 1.977E-06 | 1.370E-08 |
| $R_2$ | 1.198E-05 | 2.615E-06 | 1.521E-08 |
| $R_3$ | −1.238E-05 | −1.538E-07 | 2.674E-09 |
| $R_{10}$ | 6.532Ei-06 | −1.397E-07 | −1.190E-09 |
| $R_{11}$ | 2.417E-05 | −5.041E-08 | −6.779E-09 |

| SURFACE | AG (10TH) | AH (12TH) | AI (14TH) |
|---|---|---|---|

TABLE 2B-continued

POLYNOMIAL ASPHERS
(COEFFICIENTS OF THE EVEN POWERED TERMS)

| | | | |
|---|---|---|---|
| $R_1$ | 2.035E-10 | −8.096E-12 | −5.891E-14 |
| $R_2$ | 8.628E-10 | −7.193E-12 | −2.013E-13 |
| $R_3$ | 7.382E-11 | −2.453E-13 | −4.134E-14 |
| $R_{10}$ | −7.419E-12 | −1.132E-14 | 1.729E-15 |
| $R_{11}$ | 3.424E-13 | 2.950E-13 | 6.475E-16 |

| SURFACE | Conic Constants |
|---|---|
| $R_{10}$ | −1.000E+00 |
| $R_{11}$ | −1.000E+00 |

TABLE 2C

ZOOM SPACING DATA

| POSITION | $S_4$ | BFL | EFL | F/# |
|---|---|---|---|---|
| 1 | 10.15 | 14.0 | 36.0 | 4.4 |
| 2 | 3.59 | 36.0 | 55.0 | 6.3 |
| 3 | 0.05 | 62.0 | 77.0 | 6.8 |

EXAMPLE 3

TABLE 3A

| SURFACE | RADIUS | THICKNESS/SPACING | $N_e$ | V |
|---|---|---|---|---|
| $R_1$ | −28.22 | 1.38 | 1.5949 | 30.7 |
| $R_2$ | −26.38 | .04 | | |
| Diaphragm | ∞ | 5.22 | | |
| $R_3$ | −30.32 | 1.38 | 1.5949 | 30.7 |
| $R_4$ | 35.63 | .14 | | |
| $R_5$ | 34.98 | 3.20 | 1.4938 | 56.9 |
| $R_6$ | −19.43 | .10 | | |
| $R_7$ | 424.75 | 3.20 | 1.4938 | 56.9 |
| $R_8$ | −15.21 | Variable | | |
| $R_9$ | −30.75 | 3.38 | 1.5949 | 30.7 |
| $R_{10}$ | −13.02 | 2.61 | | |
| $R_{11}$ | −9.60 | 1.84 | 1.5387 | 40.2 |
| $R_{12}$ | 51.62 | Variable | | |

TABLE 3B

POLYNOMIAL ASPHERS
(COEFFICIENTS OF THE EVEN POWERED TERMS)

| SURFACE | AD (4TH) | AE (6TH) | AF (8TH) |
|---|---|---|---|
| $R_1$ | −7.800E-05 | 2.267E-06 | 2.616E-08 |
| $R_2$ | 2.022E-06 | 2.554E-06 | 2.212E-08 |
| $R_3$ | −1.698E-05 | −1.968E-07 | −3.402E-10 |
| $R_{10}$ | 1.654E-05 | −1.717E-07 | −1.062E-09 |
| $R_{11}$ | 3.965E-05 | −1.210E-07 | −6.236E-09 |

| SURFACE | AG (10TH) | AH (12TH) | AI (14TH) |
|---|---|---|---|
| $R_1$ | 4.634E-10 | −8.507E-12 | −4.889E-14 |
| $R_2$ | 7.913E-10 | −4.300E-12 | −1.361E-13 |
| $R_3$ | 1.310E-10 | −7.463E-14 | −5.706E-14 |
| $R_{10}$ | −4.571E-12 | −1.848E-14 | 1.134E-15 |
| $R_{11}$ | 3.440E-12 | 2.935E-13 | −3.494E-16 |

| SURFACE | Conic Constants |
|---|---|
| $R_{10}$ | −1.000E+00 |
| $R_{11}$ | −1.000E+00 |

TABLE 3C

ZOOM SPACING DATA

| POSITION | $S_4$ | BFL | EFL | F/# |
|---|---|---|---|---|
| 1 | 9.65 | 14.0 | 36.0 | 4.4 |
| 2 | 3.42 | 36.0 | 55.0 | 6.3 |
| 3 | 0.05 | 61.0 | 77.0 | 6.8 |

EXAMPLE 4

TABLE 4A

| SURFACE | RADIUS | THICKNESS/SPACING | $N_e$ | V |
|---|---|---|---|---|
| $R_1$ | −22.20 | 1.70 | 1.5949 | 30.7 |
| $R_2$ | −20.62 | 1.20 | | |
| Diaphragm | ∞ | 5.44 | | |
| $R_3$ | −21.97 | 1.38 | 1.5949 | 30.7 |
| $R_4$ | 66.89 | .02 | | |
| $R_5$ | 71.02 | 3.30 | 1.4938 | 56.9 |
| $R_6$ | −17.60 | .10 | | |
| $R_7$ | 71.02 | 3.30 | 1.4938 | 56.9 |
| $R_8$ | −17.60 | Variable | | |
| $R_9$ | −32.76 | 3.39 | 1.5949 | 30.7 |
| $R_{10}$ | −14.05 | 2.65 | | |
| $R_{11}$ | −10.12 | 3.00 | 1.5387 | 40.2 |
| $R_{12}$ | 54.77 | Variable | | |

TABLE 4B

POLYNOMIAL ASPHERS
(COEFFICIENTS OF THE EVEN-POWERED TERMS)

| SURFACE | AD (4TH) | AE (6TH) | AF (8TH) |
|---|---|---|---|
| $R_1$ | −7.379E-05 | 2.331E-06 | −2.573E-08 |
| $R_2$ | −2.041E-05 | 3.435E-06 | −9.674E-08 |
| $R_3$ | −1.814E-05 | 2.117E-07 | −1.381E-08 |
| $R_{10}$ | 9.443E-06 | 9.630E-08 | −8.402E-09 |
| $R_{11}$ | 2.147E-05 | 3.209E-07 | −1.556E-08 |

| SURFACE | AG (10TH) | AH (12TH) | AI (14TH) |
|---|---|---|---|
| $R_1$ | −1.012E-10 | 1.198E-11 | −1.005E-13 |
| $R_2$ | 2.771E-09 | −5.493E-11 | 5.710E-13 |
| $R_3$ | 1.838E-10 | −9.057E-12 | 1.396E-13 |
| $R_{10}$ | 1.818E-11 | 7.571E-13 | −4.016E-15 |
| $R_{11}$ | 2.916E-13 | 1.723E-12 | −8.507E-15 |

| SURFACE | Conic Constants |
|---|---|
| $R_7$ | −1.000E+00 |
| $R_8$ | −1.000E+00 |

TABLE 4C

ZOOM SPACING DATA

| POSITION | $S_4$ | BFL | EFL | F/# |
|---|---|---|---|---|
| 1 | 9.83 | 14.0 | 37.0 | 4.6 |
| 2 | 3.87 | 35.0 | 55.0 | 6.4 |
| 3 | 0.37 | 61.0 | 77.0 | 6.8 |

EXAMPLE 5

TABLE 5A

| SURFACE | RADIUS | THICKNESS/SPACING | $N_e$ | V |
|---|---|---|---|---|
| $R_1$ | −92.43 | 1.38 | 1.5949 | 30.7 |

TABLE 5A-continued

| SURFACE | RADIUS | THICKNESS/ SPACING | $N_e$ | V |
|---|---|---|---|---|
| $R_2$ | −107.93 | 3.07 | | |
| Diaphragm | ∞ | Variable | | |
| $R_3$ | −193.80 | 1.38 | 1.5949 | 30.7 |
| $R_4$ | 21.35 | .24 | | |
| $R_5$ | 28.37 | 3.04 | 1.4938 | 56.9 |
| $R_6$ | −23.74 | .00 | | |
| $R_7$ | 324.72 | 3.04 | 1.4938 | 56.9 |
| $R_8$ | −14.41 | Variable | | |
| $R_9$ | −49.77 | 3.38 | 1.5949 | 30.7 |
| $R_{10}$ | −15.50 | 2.11 | | |
| $R_{11}$ | −10.14 | 1.84 | 1.5387 | 40.2 |
| $R_{12}$ | 32.88 | Variable | | |

TABLE 5B

POLYNOMIAL ASPHERS
(COEFFICIENTS OF THE EVEN POWERED TERMS)

| SURFACE | AD (4TH) | AE (6TH) | AF (8TH) |
|---|---|---|---|
| $R_1$ | 1.914E-05 | 1.402E-06 | 5.820E-09 |
| $R_2$ | 1.039E-04 | 1.852E-06 | 2.193E-08 |
| $R_8$ | 1.794E-05 | −2.615E-09 | −4.649E-09 |
| $R_{11}$ | 3.882E-06 | 9.640E-09 | 3.517E-09 |

| SURFACE | AG (10TH) | AH (12THI) | AI (14TH) |
|---|---|---|---|
| $R_1$ | 1.113E-10 | −6.374E-12 | 1.134E-13 |
| $R_2$ | −3.461E-10 | 5.131E-12 | 1.021E-13 |
| $R_8$ | 1.596E-11 | 1.397E-12 | −2.190E-14 |
| $R_{11}$ | 1.982E-11 | 2.084E-13 | −2.099E-15 |

| SURFACE | Conic Constants |
|---|---|
| $R_{11}$ | −1.000E+00 |

TABLE 5C

ZOOM SPACING DATA

| POSITION | $S_2$ | $S_4$ | BFL | EFL | F/# |
|---|---|---|---|---|---|
| 1 | 7.95 | 8.43 | 15.0 | 36.0 | 4.4 |
| 2 | 6.86 | 3.09 | 35.0 | 55.0 | 6.3 |
| 3 | 6.04 | .20 | 60.0 | 77.0 | 6.8 |

EXAMPLE 6

TABLE 6A

| SURFACE | RADIUS | THICKNESS/ SPACING | $N_e$ | V |
|---|---|---|---|---|
| $R_1$ | −17.45 | 2.08 | 1.5387 | 40.2 |
| $R_2$ | −19.50 | Variable | | |
| $R_3$ | 36.30 | 1.50 | 1.5949 | 30.7 |
| $R_4$ | 12.02 | 6.30 | 1.4938 | 56.9 |
| $R_5$ | −15.06 | Variable | | |
| $R_6$ | −32.92 | 2.50 | 1.5949 | 30.7 |
| $R_7$ | −18.64 | 3.42 | | |
| $R_8$ | −12.39 | 2.00 | 1.4938 | 56.9 |
| $R_9$ | 42.68 | Variable | | |

TABLE 6B

POLYNOMIAL ASPHERS
(COEFFICIENTS OF THE EVEN POWERED TERMS)

| SURFACE | AD (4TH) | AE (6TH) | AF (8TH) |
|---|---|---|---|
| $R_1$ | −4.986E-06 | 8.155E-07 | 1.223E-68 |
| $R_2$ | 2.179E-05 | 9.499E-07 | 8.386E-09 |
| $R_5$ | −7.737E-06 | −2.031E-07 | −5.159E-10 |
| $R_8$ | 1.409E-05 | −6.753E-08 | −2.022E-10 |

| SURFACE | AG (10TH) | AH (12TH) | AI (14TH) |
|---|---|---|---|
| $R_1$ | 9.304E-11 | 7.065E-14 | −1.363E-14 |
| $R_2$ | 1.231E-10 | 4.337E-13 | −1.015E-14 |
| $R_5$ | 4.186E-12 | 3.886E-14 | −2.251E-15 |
| $R_8$ | −4.991E-12 | −1.114E-14 | 6.112E-16 |

| SURFACE | Conic Constants |
|---|---|
| $R_1$ | 5.413E-01 |
| $R_2$ | −2.056E-01 |
| $R_5$ | −9.713E-01 |
| $R_8$ | −7.335E-01 |

TABLE 6C

ZOOM SPACING DATA

| POSITION | $S_1$ | $S_2$ | BFL | EFL | F/# |
|---|---|---|---|---|---|
| 1 | 8.58 | 9.62 | 15.14 | 39.01 | 4.4 |
| 2 | 7.24 | 3.38 | 38.27 | 60.02 | 6.3 |
| 3 | 6.22 | .22 | 63.02 | 82.57 | 6.8 |

EXAMPLE 7

TABLE 7A

| SURFACE | RADIUS | THICKNESS/ SPACING | $N_e$ | V |
|---|---|---|---|---|
| $R_1$ | −22.12 | 1.38 | 1.5949 | 30.7 |
| $R_2$ | −20.70 | 2.00 | | |
| Diaphragm | ∞ | 3.57 | | |
| $R_3$ | −26.01 | 1.38 | 1.5949 | 30.7 |
| $R_4$ | 43.83 | .14 | | |
| $R_5$ | 40.45 | 3.20 | 1.4938 | 56.9 |
| $R_6$ | −19.50 | .10 | | |
| $R_7$ | 196.79 | 3.20 | 1.4938 | 56.9 |
| $R_8$ | −15.32 | Variable | | |
| $R_9$ | −29.12 | 3.38 | 1.5949 | 30.7 |
| $R_{10}$ | −13.11 | 2.80 | | |
| $R_{11}$ | −9.78 | 1.84 | 1.5387 | 40.2 |
| $R_{12}$ | 53.50 | Variable | | |

TABLE 7B

POLYNOMIAL ASPHERS
(COEFFICIENTS OF THE EVEN POWERED TERMS)

| SURFACE | AD (4TH) | AE (6TH) | AF (8TH) |
|---|---|---|---|
| $R_1$ | −1.014E-04 | 1.832E-06 | 1.962E-08 |
| $R_2$ | −3.027E-05 | 1.928E-06 | 1.354E-08 |
| $R_3$ | −3.020E-05 | −4.093E-07 | −1.505E-09 |
| $R_{10}$ | 1.672E-05 | −1.786E-07 | −1.277E-09 |
| $R_{11}$ | 4.083E-05 | −1.527E-07 | −6.321E-09 |

| SURFACE | AG (10TH) | AH (12TH) | AI (14TH) |
|---|---|---|---|
| $R_1$ | 3.655E-10 | −1.033E-11 | −6.551E-14 |
| $R_2$ | 6.466E-10 | −6.909E-12 | −2.016E-13 |
| $R_3$ | 9.523E-11 | −1.208E-12 | −8.118E-14 |
| $R_{10}$ | −5.269E-12 | −1.302E-14 | 1.216E-15 |
| $R_{11}$ | 3.343E-12 | 3.000E-13 | −4.536E-16 |

TABLE 7B-continued

POLYNOMIAL ASPHERS
(COEFFICIENTS OF THE EVEN POWERED TERMS)

| SURFACE | Conic Constants |
|---|---|
| $R_{10}$ | −1.000E+00 |
| $R_{11}$ | −1.000E+00 |

TABLE 7C

ZOOM SPACING DATA

| POSITION | $S_4$ | BFL | EFL | F/# |
|---|---|---|---|---|
| 1 | 9.64 | 14.34 | 36.01 | 4.4 |
| 2 | 3.42 | 36.36 | 55.03 | 6.3 |
| 3 | .05 | 62.03 | 77.07 | 6.8 |

EXAMPLE 8

TABLE 8A

| SURFACE | RADIUS | THICKNESS/ SPACING | $N_e$ | V |
|---|---|---|---|---|
| $R_1$ | −27.61 | 1.17 | 1.5387 | 40.2 |
| $R_2$ | −50.62 | .20 | | |
| Diaphragm | ∞ | 5.32 | | |
| $R_3$ | 32.83 | 1.50 | 1.5949 | 30.7 |
| $R_4$ | 11.05 | 6.30 | 1.4938 | 56.9 |
| $R_5$ | −13.23 | Variable | | |
| $R_6$ | −27.39 | 2.50 | 1.5949 | 30.7 |
| $R_7$ | −15.90 | 4.56 | | |
| $R_8$ | −9.67 | 2.00 | 1.4938 | 56.9 |
| $R_9$ | 82.07 | Variable | | |

TABLE 8B

POLYNOMIAL ASPHERS
(COEFFICIENTS OF THE EVEN POWERED TERMS)

| SURFACE | AD (4TH) | AE (6TH) | AF (8TH) |
|---|---|---|---|
| $R_1$ | 3.021E-06 | 2.610E-06 | 1.113E-08 |
| $R_2$ | 8.277E-05 | 3.343E-06 | 2.637E-08 |
| $R_5$ | −3.134E-05 | −3.891E-07 | 1.916E-10 |
| $R_6$ | −8.205E-06 | −2.467E-07 | 2.442E-09 |

| SURFACE | AG (10TH) | AH (12TH) | AI (14TH) |
|---|---|---|---|
| $R_1$ | 2.7859-10 | 4.123E-13 | −1.187E-13 |
| $R_2$ | 8.159E-11 | −1.545E-12 | 1.204E-13 |
| $R_5$ | −1.182E-11 | −2.309E-13 | −2.179E-15 |
| $R_6$ | 3.581E-12 | −7.838E-13 | 6.153E-15 |

| SURFACE | Conic Constants |
|---|---|
| $R_1$ | 5.413E-01 |
| $R_2$ | −2.056E-01 |
| $R_5$ | −9.713E-01 |
| $R_6$ | −7.335E-01 |

TABLE 8C

ZOOM SPACING DATA

| POSITION | $R_5$ | BFL | EFL | F/# |
|---|---|---|---|---|
| 1 | 9.12 | 14.89 | 39.00 | 4.4 |
| 2 | 3.21 | 37.11 | 60.00 | 6.3 |
| 3 | .22 | 60.92 | 82.51 | 6.8 |

The invention has been described in detail with particular reference to a preferred embodiment thereof, but it will be understood that variations and modifications can be effected within the spirit and scope of the invention as described hereinabove and as defined in the appended claims. For example, the front lens unit could be divided into two or more very weak components. Similarly, one or more components of the first unit could be made into a doublet. Although, such minor changes ate within the scope of the invention, they would detract from its simplicity. Thus, a single element first unit is preferred.

We claim:

1. A zoom lens comprising two groups of lens components including, from an object side, a first positive group and a second negative group and which zoom lens achieves zooming between a wide angle position and a narrow angle position by changing the distance between the first and the second groups, said first group including two lens units, a first, weak positive power unit having no strong lens component, said weak first unit positioned on an object side of said first group and a second positive unit following said first unit, said second group having negative power and providing most of the magnification change during zooming, said zoom lens satisfying the following conditions:

$$\frac{K_1}{K_w} < 0.1, \text{ and } \frac{K_w}{K_t} \geq 2.0,$$

where $K_1$ is the power of the first unit, $K_w$ is the power of the zoom lens at its wide angle position, and $K_t$ is the power of the zoom lens in its telephoto position.

2. A zoom lens according to claim 1, wherein the first unit has at least one aspheric surface.

3. A zoom lens according to claim 2, wherein the first unit is a single positive component.

4. A zoom lens according to claim 3, wherein an aperture stop is positioned toward the object side from the second unit.

5. A zoom lens according to claim 2, wherein an aperture stop is positioned toward the object side from the second unit.

6. A zoom lens according to claim 1, wherein an aperture stop is positioned toward the object side from the second unit.

7. A zoom lens according to claim 1, wherein said first optical unit is a single element having at least one aspheric surface.

8. A zoom lens according to claim 1, wherein the second unit consists of a doublet and a singlet.

9. A zoom lens according to claim 1, wherein the second group consists of a doublet.

10. A zoom lens according to claim 1, wherein said second unit includes at least one negative lens element providing substantially all of the color correction of the first group.

11. A zoom lens according to claim 1, wherein the space between said first unit and said second unit varies during zooming.

12. A zoom lens according to claim 1, wherein the space between said first unit and said second unit does not vary during zooming.

13. A zoom lens comprising two groups of lens components including, from an object side, a first positive group and a second negative group and which zoom lens achieves zooming between a wide angle position and a narrow angle position by changing the distance between the first and the second groups, said first group including two lens units and an aperture stop, a first, weak positive power unit having no strong lens component, said first unit having at least one aspheric surface, said first unit positioned on an object side of said first group and a second positive unit following said first unit, said aperture stop is positioned toward the object from said second unit, said second group having negative power and providing most of the magnification change during zooming, said zoom lens satisfying the following conditions:

$$\frac{K_1}{K_w} < 0.1, \text{ and } \frac{K_w}{K_t} \geq 2.0,$$

where $K_1$ is the power of the first unit, $K_w$ is the power of the zoom lens at its wide angle position, and $K_t$ is the power of the zoom lens in its telephoto position.

14. A zoom lens comprising two groups of lens components including, from an object side, a first positive group and a second negative group and which zoom lens achieves zooming between a wide angle position and a narrow angle position by changing the distance between the first and the second groups, said first group including two lens units, a first, weak positive power unit having no strong lens component, said weak positive power first unit positioned on an object side of said first group and a second positive unit following said first unit, said second group having negative power and providing most of the magnification change during zooming, said zoom lens satisfying the following conditions:

$$\frac{K_1}{K_w} < 0.1, \text{ and } \frac{K_w}{K_t} \geq 2.0,$$

where $K_1$ is the power of the first unit, $K_w$ is the power of the zoom lens at its wide angle position, and $K_t$ is the power of the zoom lens in its telephoto position, wherein the space between said first unit and said second unit varies during zooming.

* * * * *